(12) United States Patent
Muller et al.

(10) Patent No.: US 7,296,827 B2
(45) Date of Patent: Nov. 20, 2007

(54) RELEASABLE CONNECTION ARRANGEMENT FOR TWO ROTATIONALLY SYMMETRICAL COMPONENTS

(75) Inventors: Andreas Muller, Steinheim (DE); Matthias Wangemann, Schlb Holte-Strukenbrock (DE)

(73) Assignee: Holter Regelarmaturen GmbH & Co. KG (DE)

( * ) Notice: Subject to any disclaimer, the term of this patent is extended or adjusted under 35 U.S.C. 154(b) by 185 days.

(21) Appl. No.: 11/065,486

(22) Filed: Feb. 24, 2005

(65) Prior Publication Data

US 2005/0207834 A1 Sep. 22, 2005

(30) Foreign Application Priority Data

Mar. 17, 2004 (DE) .................. 10 2004 013 332

(51) Int. Cl.
*F16L 17/00* (2006.01)
*F16L 19/06* (2006.01)

(52) U.S. Cl. .................. 285/339; 285/332; 285/332.2; 285/421; 403/337

(58) Field of Classification Search ............. 285/121.3, 285/121.5, 332, 332.1, 332.2, 339, 342, 421; 403/261–262, 335, 337
See application file for complete search history.

(56) References Cited

U.S. PATENT DOCUMENTS

| | | | | |
|---|---|---|---|---|
| 1,873,620 A | * | 8/1932 | Moore | .................. 277/620 |
| 1,908,592 A | * | 5/1933 | Flather | .................. 82/147 |
| 2,608,368 A | * | 8/1952 | Bagge et al. | ................ 248/200 |
| 4,351,407 A | * | 9/1982 | Call | .................. 180/385 |
| 4,656,890 A | * | 4/1987 | Marquardt | .................. 475/348 |
| 5,163,816 A | * | 11/1992 | Goetzke et al. | ........ 416/204 A |
| 2002/0101079 A1 | * | 8/2002 | Ehrke | ..................... 285/354 |
| 2004/0036280 A1 | * | 2/2004 | Belcher | ................... 285/222.2 |

* cited by examiner

Primary Examiner—Aaron Dunwoody
Assistant Examiner—Fannie C. Kee
(74) Attorney, Agent, or Firm—Fulbright & Jaworski; Jan K. Simpson

(57) ABSTRACT

A releasable connection arrangement that includes, a first component, which has a collar projecting radially outwards with a first clamping surface and a first bearing surface and a socket disposed at an open end of a second component for retaining the collar by gripping round it axially. A second bearing surface is formed in the socket to co-operate with the first bearing surface. A groove is formed either in the first or in the second bearing surface to receive a seal. A second clamping surface is formed in the socket at an axial distance from the second bearing surface in which a number of ring wedge-shaped tensioning members which are distributed over the circumference and are disposed such that first wedge surfaces abut the first clamping surface and second wedge surfaces abut the second clamping surface.

15 Claims, 11 Drawing Sheets

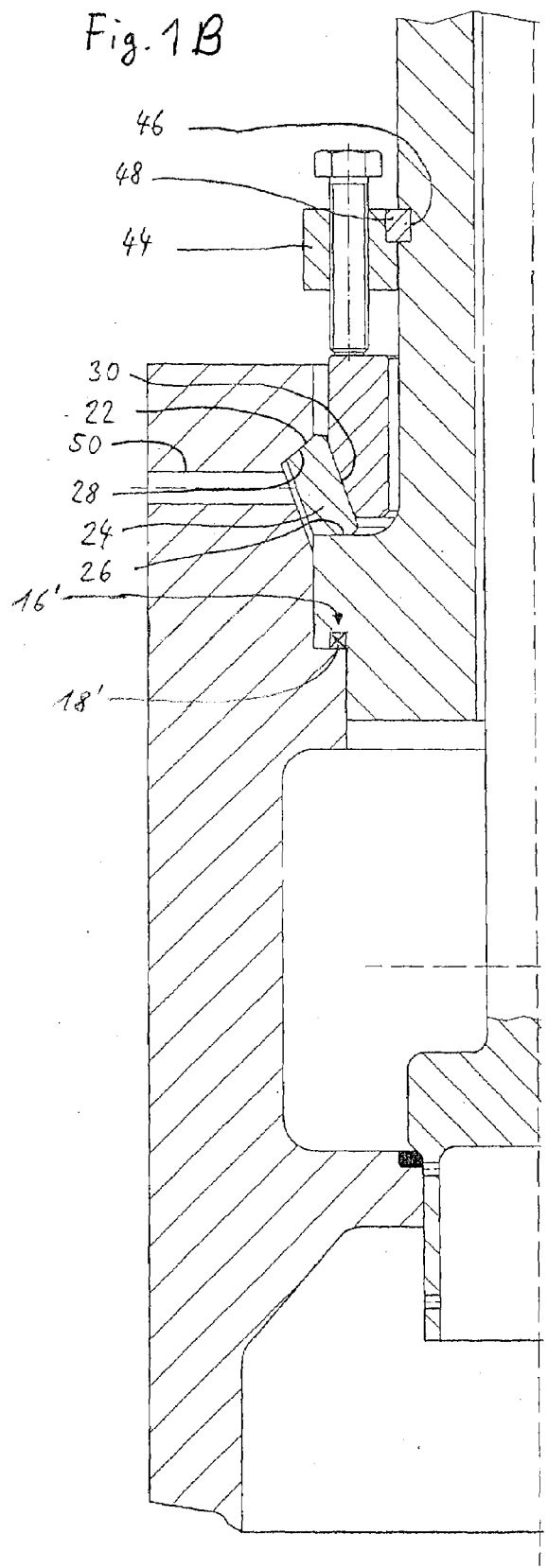

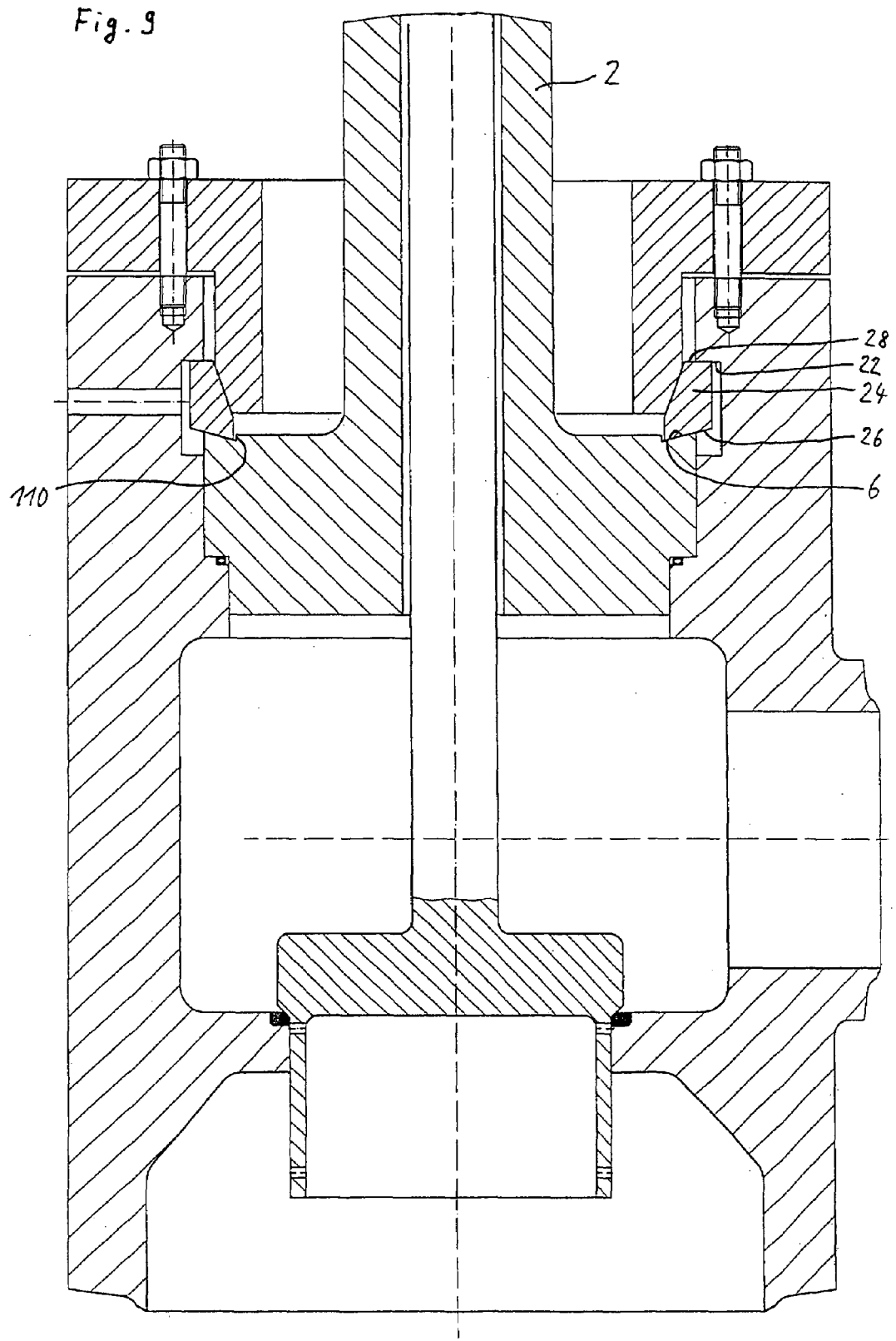

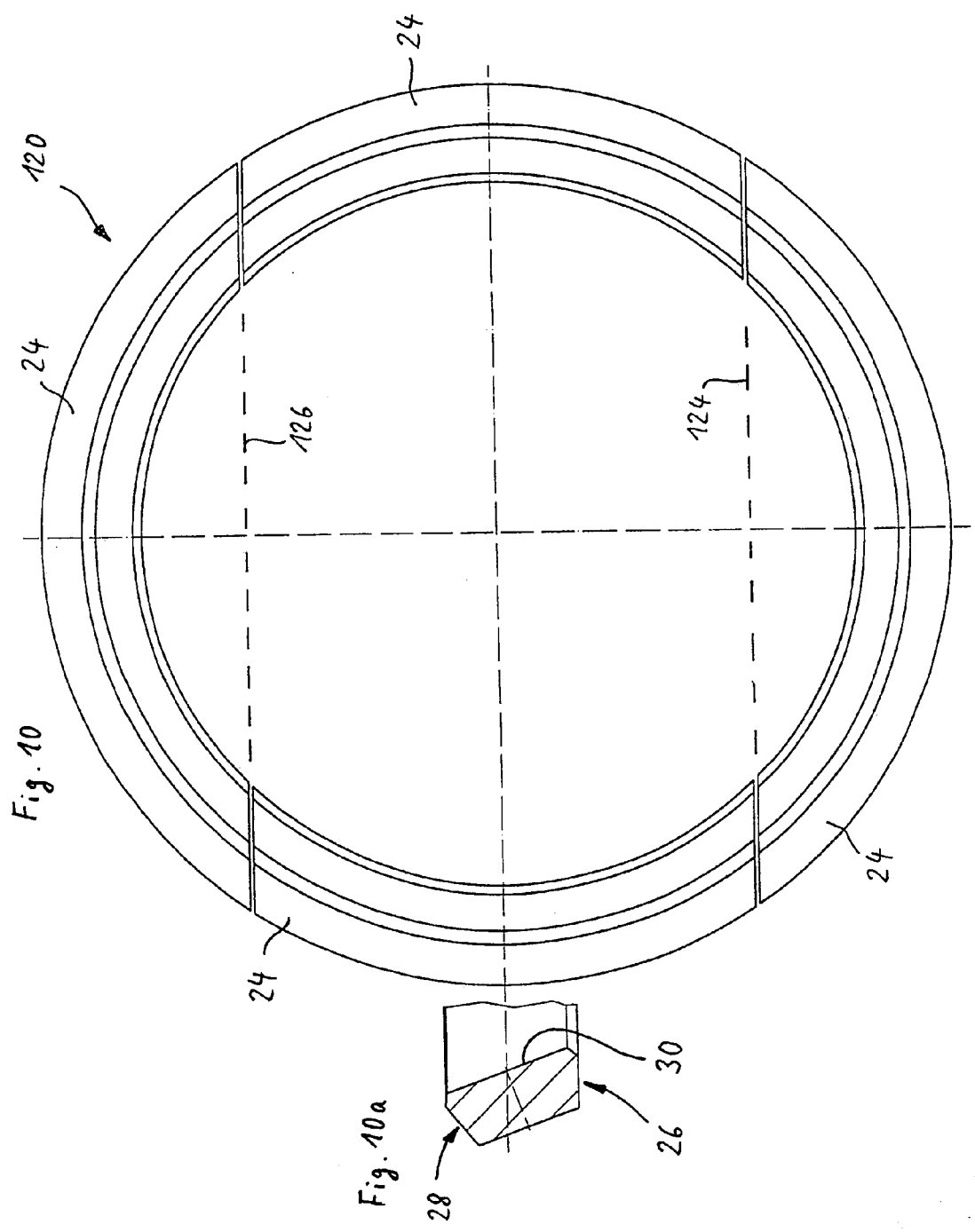

RELEASABLE CONNECTION ARRANGEMENT FOR TWO ROTATIONALLY SYMMETRICAL COMPONENTS

CROSS-REFERENCE TO RELATED APPLICATIONS

This application claims priority to DE 102004013332.8 filed Mar. 17, 2004.

TECHNICAL FIELD

The invention relates to a releasable connection arrangement, with a non-positive and positive fit, for two rotationally symmetrical components at a connection point, especially for creating a leak-proof connection between closure elements on power plant valves. A connection arrangement of this kind is known, for example, from the German Utility Model DE 298 22 922 U1.

BACKGROUND OF THE INVENTION

In the known connection arrangement, each tensioning member has the force of a straining screw acting directly upon it, the screw acting between the tensioning members and one shoulder of the first component and bracing the tensioning member like a wedge along the wedge surfaces between the components.

While a connection arrangement of this kind is beneficial from the point of view of the frictional contact connection, it nevertheless possesses the disadvantage that for installation or dismantling purposes, numerous straining screws have to be tightened evenly, which takes a relatively great amount of time. Uneven torque can lead to damage in operation. Apart from that, it is time-consuming and expensive to produce the numerous counter-bearings needed for the straining screws.

The invention has set itself the objective of improving a connection arrangement of the generic kind, especially with regard to the disadvantages described above.

BRIEF SUMMARY OF THE INVENTION

The invention achieves this objective by means of a connection arrangement of the generic kind characterized in that an expanding ring is provided, abutting third wedge surfaces of the tensioning members with an outer expanding surface, and tensioning means are provided, acting between the expanding ring and one of the components, with which the expanding ring can be moved axially and the tensioning members can be moved radially or radially/axially.

Thanks to the arrangement in accordance with the invention, with an expanding ring distributing the tensioning forces of the tensioning means over the circumference, fewer or different tensioning means can be provided than is the case in the state of the art, so that assembly or dismantling can be performed more easily and more quickly. Apart from that the flow of forces through the connection can be improved still further.

It is preferably provided that the first and second bearing surfaces run radially. The groove can be formed in part of a radial portion of the first or second bearing surface so as to arrange the seal in parallel to the bearing surface proper.

It is preferably provided that the first clamping surface should include a wedge angle with the second clamping surface, which is matched to a cone angle of the outer expanding surface in such a way that the expanding ring causes self-locking bracing of the components.

It can be provided that the first clamping surface runs radially and the second clamping surface runs conically.

Alternatively, it can be provided that the first clamping surface runs conically and the second clamping surface runs radially.

In a further alternative, it can be provided that the first and second clamping surfaces run conically.

The expanding ring can be formed continuously in the circumferential direction, or alternatively it can be provided that the expanding ring has radial expansion slots arranged spread out in the circumferential direction and a conically formed inner expanding surface with which it abuts a correspondingly conically formed third expanding surface disposed on the second component, and that it can be, radially expanded by axial displacement. In this context, it can be provided that the outer expanding surface and the third wedge surfaces of the tensioning members are in each case formed axis-cylindrically or conically.

It can be provided that the expansion slots do not extend over an entire axial length of the expanding ring. Alternatively, the invention envisages that the expanding ring is provided with expansion slots arranged in an alternating way in the circumferential direction, in the manner of a collet.

The expanding ring can be formed from separate expanding members disposed spread out over the circumference, and a thrust collar gripping round them.

In a preferred embodiment of the invention, it is provided that there is a retaining ring releasably mounted on the first component, especially on the collar, adjacent to the first clamping surface, which retaining ring has a retaining surface running substantially axis-cylindrically and abutting a locking surface, which runs substantially axis-cylindrically, of the tensioning members and preventing the tensioning members and thus the connection arrangement from being released completely when the expanding ring is released.

The tensioning means can be formed as straining screws distributed over the circumference. The straining screws can be located in a straining ring secured axially to the first component, especially by means of a circumferential groove and a sliding block.

Alternatively, it can be provided that the straining screws engage through the expanding ring into the first component, especially into the collar.

As a further alternative, it can be provided that the expanding ring has a flange ring formed integrally with it or resting on it, through which the straining screws engage in a circumferential portion of the second component located radially outside the tensioning members.

Finally, it can be provided as an alternative that the tensioning means can be formed by a threaded nut acting on the expanding ring and co-operating with an external or internal thread of the first or second component.

In a preferred embodiment of the invention, it is provided that the tensioning members consist of parts of a ring divided along two parallel secant planes which can be mounted, in a manner known per se, at mutual (circumferential) distances that are advantageously small compared to parts obtained by radial sections, i.e. they can be inserted between the first and second components.

The invention also relates to a set of tensioning members for a connection arrangement according to the invention, formed from parts of a ring divided along two parallel secant planes and having first wedge surfaces formed radially or conically outwardly, second wedge surfaces formed radially or conically outwardly and internal third, axis-cylindrical or conical, wedge surfaces. Whereas the third wedge surfaces may be formed either axis-cylindrically or conically with any combination of angles in the first and second wedge surfaces, either the first wedge surfaces may be radial and the second wedge surfaces conical, or vice versa, or both may be conical.

BRIEF DESCRIPTION OF THE DRAWINGS

The invention will now be explained by means of various embodiments, reference being made to a drawing, in which FIG. 1B shows an alternate view of the cover lock, FIGS. 2 to 9 show further embodiments as variations on the connection arrangement shown in FIG. 1, and FIGS. 10 and 10a show a plan view and a sectional view of an expanding ring of the invention.

DETAILED DESCRIPTION OF THE INVENTION

The invention will now be explained by reference to various embodiments relating to a novel cover lock of a power plant valve. In power plant valves for new conventional fossil-fuel thermal power plants, which are subject to high stresses, the operating pressures reach up to approx. 300 bar, while the operating temperatures can reach levels of 700° C. and more. The service lives of self-sealing graphite cover seals are not adequate in view of the extreme temperatures and pressures of the media. A graphite seal rapidly oxidizes to $CO_2$ when an operating temperature of 500° C. is exceeded, permitting atmospheric oxygen to enter.

At operating temperatures on these levels, it is conceivable to use, among other things, a radially operative, high-temperature-resistant metal O-ring seal. From the structural point of view, the cover lock with a metal O-ring seal must be designed in such a way that the metal O-ring is placed in metal-to-metal contact. With conventional flange locks or self-sealing locks, this sealing method is of only limited feasibility or leads to disproportionately large dimensions of the housing and the lock member, which are not suitable.

The construction of the invention makes it possible to design a cover lock for valves in an advantageous manner such that a metal O-ring seal is located in metal-to-metal contact and the pressure forces occurring can be absorbed by the twin action of a rotationally symmetrical cone system. According to the invention, the operating forces are intercepted by positive-locking ring segments provided with a plurality of conical lateral surfaces which are supported outwardly on the housing and inwardly on an expanding ring by means of cone envelope surfaces. If the angle of the cone is selected in the region of self-locking, i.e. the tangent of the angle of incline is smaller than the lowest static friction figure to be expected, this ensures that the axial reaction forces acting on the pre-tensioning members (tensioning means in the form of bolts) are small or virtually zero.

Since the advantageous structural design means that only low pre-tensioning forces are required, which are independent of the operating pressure, relaxation and material fatigue do not occur in the tensioning means, and the dimensions relative to the magnitude of the forces which can be transmitted remain relatively small compared to conventional flange locks. The favorable flow of forces through the components connected to the twin-action, rotationally symmetrical cone system generates the lowest possible folding moments and bending moments and deformations in the housing and cover. In the outer tensioning members, which are in the shape of cone segments, mainly shearing strains occur, whereas in the expanding ring or supporting cone it is mainly tangential strains or, in the case of a slotted expanding ring supported on the inside, only compressive strains, which are easy to control.

Figure 1A:
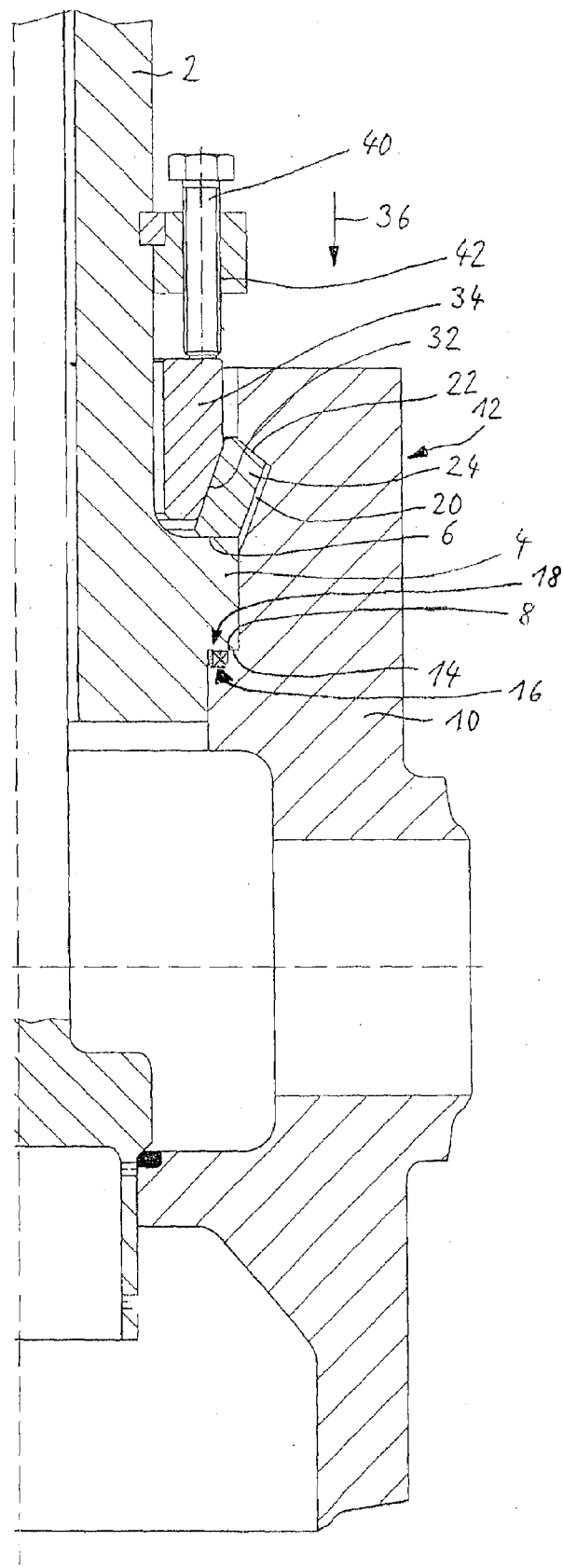
FIG. 1A shows one side of a longitudinal section view of a cover lock of a power plant valve with a connection arrangement in accordance with the invention.

FIGS. 1A-1B shows different embodiments of a connection arrangement of the invention, in which a first component, which is rotationally symmetrical at least at the connection point and is in this case a cover 2 of a power plant valve, has a collar 4 projecting radially outwards, on which are formed a first, radial clamping surface 6 and a first, likewise radial, bearing surface 8.

A second component 10, in this case a housing of a power plant valve, which is likewise formed rotationally symmetrical in the region of the connection point shown at the top in FIG. 1A has at an open end a socket 12, which surrounds and axially overlaps the collar 4 of the first component 2. Formed in the socket 12 in order to co-operate with the first bearing surface 8 of the first component 2 there is a second bearing surface 14 likewise running radially, a groove 16 being formed in a radially inner region of the second bearing surface 14 to receive a metal O-ring seal 18 and a groove 16' being formed in the first bearing surface 8, a seal 18' being positioned in the groove 16' shown in FIG. 1B. The seal 18 is thus arranged in parallel to the bearing surface proper when the two components 2, 10 are fitted together and touching. Thus, the main axial forces are transmitted by the bearing surfaces and not by the seal which is thus subjected to a predetermined amount of axial compression.

In the socket 12 there is formed, at an axial distance from the second bearing surface 14, a hollowed out portion 20 and a second conical clamping surface 22, which is opposite the first clamping surface 6 of the first component 2 when the components 2, 10 are fitted together as shown.

A number of ring wedge-shaped tensioning members 24 are distributed over the circumference and are disposed with a first cone envelope or wedge surface 26 abutting the first clamping surface 6 and with a second wedge surface 28 abutting the second clamping surface 22.

An expanding ring 34 with an outer expanding surface 32 abutting third wedge surfaces 30 of the tensioning members 24 is placed in the axial direction 36 against the tensioning members 24. Tensioning means are provided between the expanding ring 34 and the first component 2 (cover) in order to move the expanding ring 34 in the axial direction 36 and thus to move the tensioning members 24 along the second clamping surface 22, i.e., in the embodiments according to FIGS. 1A-1B, both in the axial direction 36 and also radially outwards. In the embodiments according to FIGS. 1A-1B, the tensioning means are formed by straining screws 40, which are screwed into threaded holes 42 of a straining ring 44, which, for its part, is supported against a sliding block 48 inserted into a circumferential groove 46 of the first component 2. Because of the relatively low axial forces that have to be applied through the straining screws 40, neither the circumferential groove 46 nor the sliding block 48 need to be of any great size, unlike a conventional flange-like connection, in which the straining screws have to absorb the entire compressive force occurring in operation (operating pressure multiplied by the internal area of the cover). If the wedge and cone angles defined by the wedge surfaces 26, 28, 30 are selected such that self-locking occurs, the straining screws 40 merely have to apply the tensioning force needed for assembly, whereas no additional load occurs in operation, irrespective of the internal or operating pressure.

Since the compressive forces between the cover and the housing (first and second components) are transmitted through compressive and frictional forces, the actual task of the straining screws 40 is only to immobilize the connection arrangement in its frictional connection and positive locking (first component 2, second component 10, tensioning members 24 and expanding ring 34), i.e. to prevent the expanding ring 34 from coming loose because of the inevitable vibrations, shocks and the like which occur in operation.

In the region of the hollowed out portion 20 in the second component 10, holes 50 are inserted on the level of the tensioning members 24, so that the tensioning members 24 can be knocked out in the event of dismantling. Using axial threaded forcing holes and corresponding forcing screws, not shown, the expanding ring 34 can be pressed out of the conical inner ring formed by the tensioning members 24. This ensures that the connection arrangement can be dismantled with no difficulty.

Essentially, the further embodiments shown in FIGS. 2 to 9 differ from the embodiment explained above merely with regard to the design of the expanding ring 34 and its bracing with different bracing means.

Figure 2:
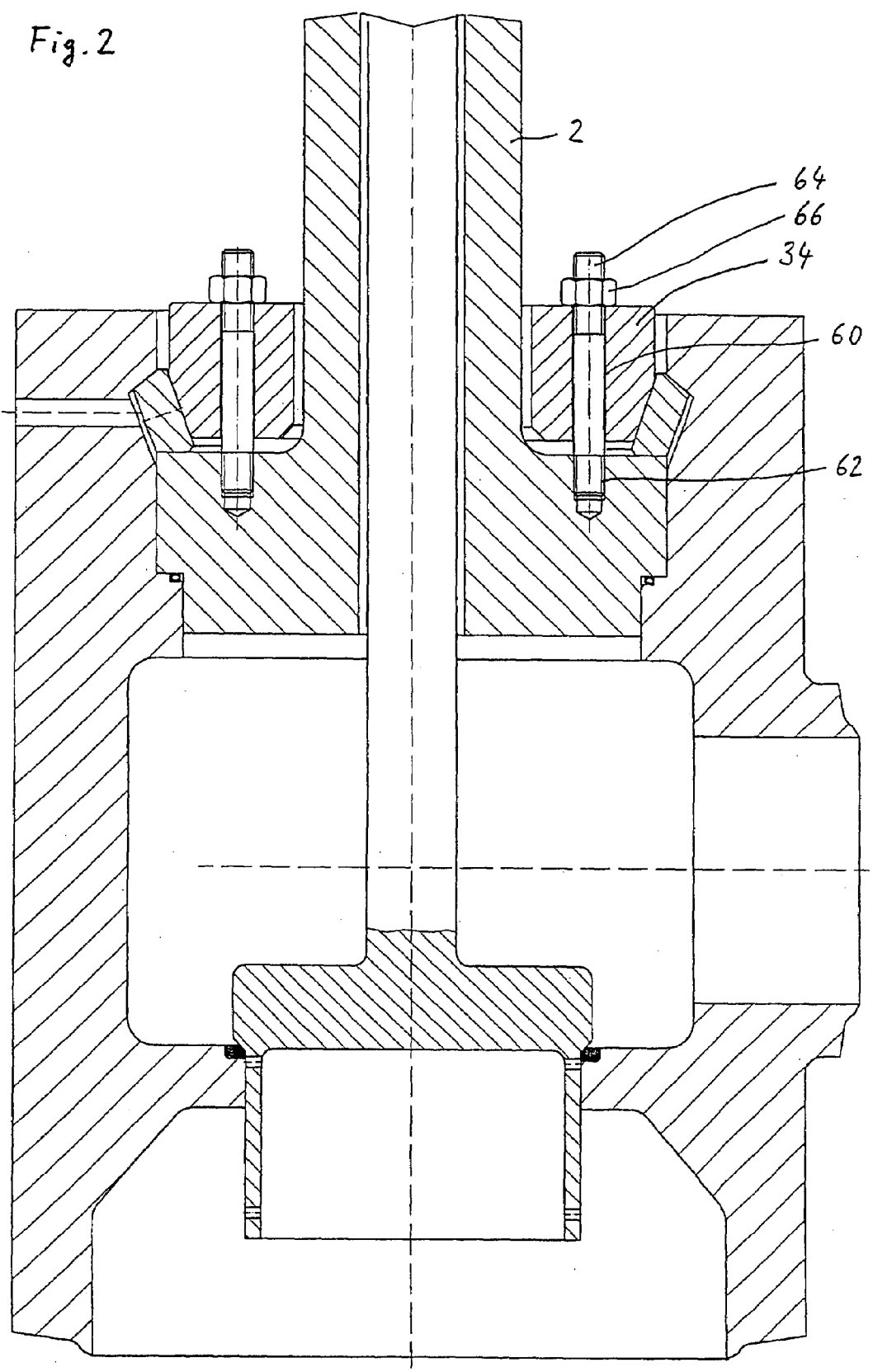

FIG. 2 shows an expanding ring 34 with axial via holes 60, through which stud bolts 64 are screwed and engage in blind threaded holes 62 in the first component 2, the axial bracing of the expanding ring 34 being achieved by fastening nuts 66. Because of the closed design of the expanding ring 34, the stud bolts 64 are merely subjected to axial strain and not to bending.

Figure 3:
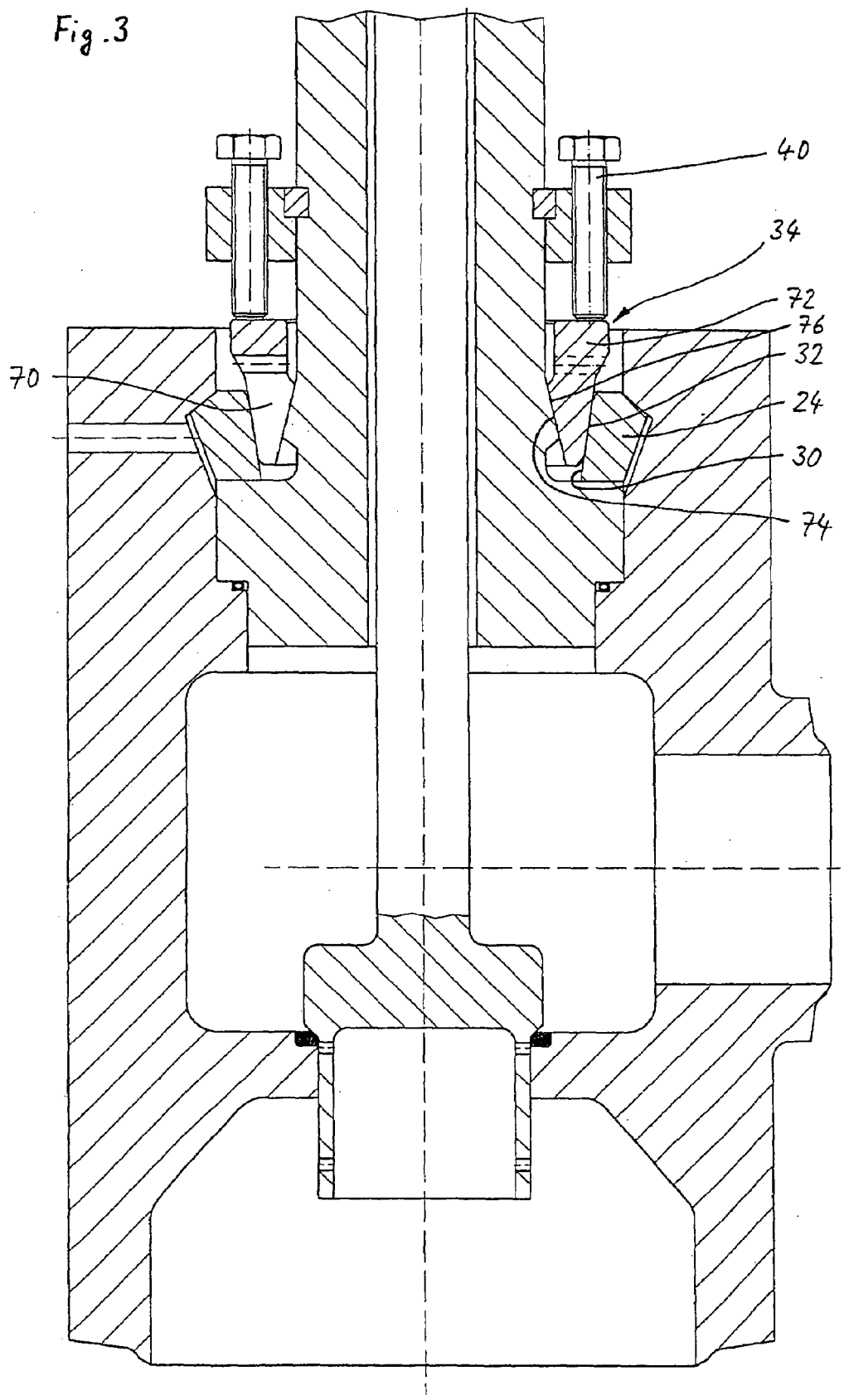

FIG. 3 shows a variant in which the expanding ring 34 is not formed in a continuous, or solid, manner in the circumferential direction, but instead has expansion slots running in the radial direction and spread out in the circumferential direction, one of which is indicated by 70 in FIG. 3. It is possible for there merely to be expansion slots inserted in an axial direction, e.g. from the lower side, each of which extends in accordance with the expansion slot indicated by 70 in FIG. 3, or alternatively the expanding ring 34 can formed like a collet, wherein successive expansion slots in the circumferential direction extend from alternately opposite axial directions into the expanding ring.

In an alternative embodiment, which is not shown, it would also be possible for the expanding ring to be composed of separate expanding members spread out over the circumference.

In all cases, it is appropriate for the expanding ring to be formed with a thrust collar, indicated by 72 in FIG. 3, gripping round the individual expanding members or the expanding portions subdivided by expansion slots. The thrust collar can be formed integrally, with expanding portions separated by expansion slots, or alternatively as a separate component.

A feature common to all such embodiments according to FIG. 3 is that the expanding ring 34 not only has an outer expanding surface 32, but in addition an inner, conical expanding surface 74, which co-operates with a correspondingly conically formed third expanding surface 76 on the second component 2. When the tensioning means (straining screws 40) are tightened, the thrust collar 72 thus moves in the axial direction 36 relative to the first component 2 in the direction of the collar 4, while the inner expanding surfaces 74 of the slotted portion of the expanding ring 34 move outwards along the third expanding surface 76 both in the axial direction 36 and in the radial direction, i.e. the ring expands.

Because of the above-mentioned radial expansion movement of the slotted portion of the expanding ring 34, the third wedge surfaces 30—which are shown conically in FIG. 3—of the tensioning members 24 and correspondingly also the outer expanding surface 32 of the expanding ring 34 could be formed axis-cylindrically, which simplifies manufacture.

Figure 4:
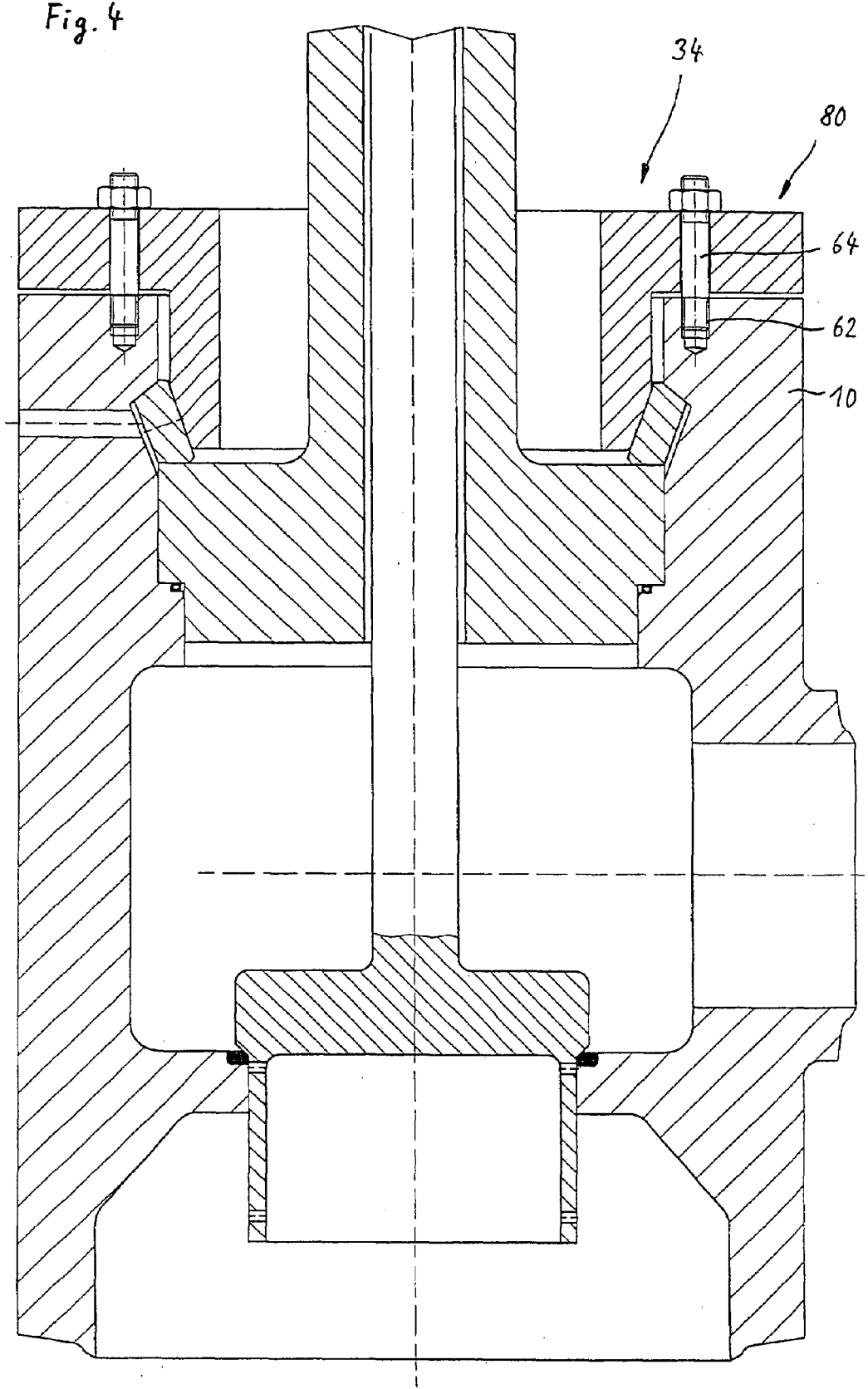

FIG. 4 shows a variant of the embodiment according to FIGS. 1 and 2, in which the expanding ring 34 has a flange portion or flange ring 80 formed integrally with it, through which stud bolts 64 are inserted, which for their part engage in blind threaded holes 62 in the second component 10. As an alternative to the integral embodiment shown, the flange ring 80 could also be formed as a separate ring gripping over the actual expanding ring 34, as will be explained in more detail below in connection with FIG. 7.

Figure 5:
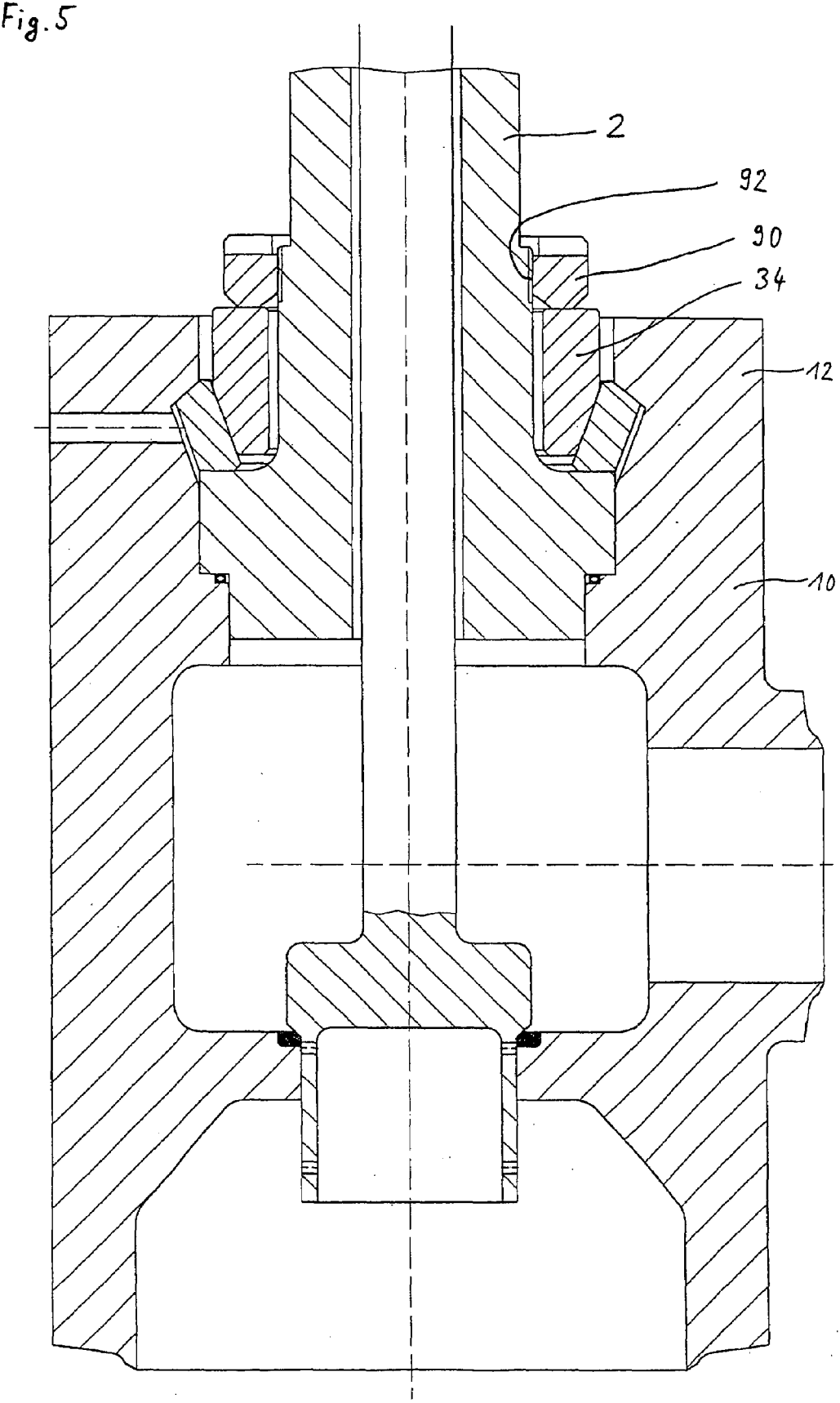

FIG. 5 shows an embodiment in which the tensioning means are formed by a threaded nut 90 acting on the expanding ring 34, the threaded nut 90 co-operating with an external thread 92 of the first component 2. Alternatively, the threaded nut 90 could be provided with an external thread and the second component 10 with an internal thread in an open end portion of the socket 12 adjacent to the second clamping surface 22, with a corresponding axial shortening of the expanding ring 34 or axial lengthening of the second component 10.

Figure 6:
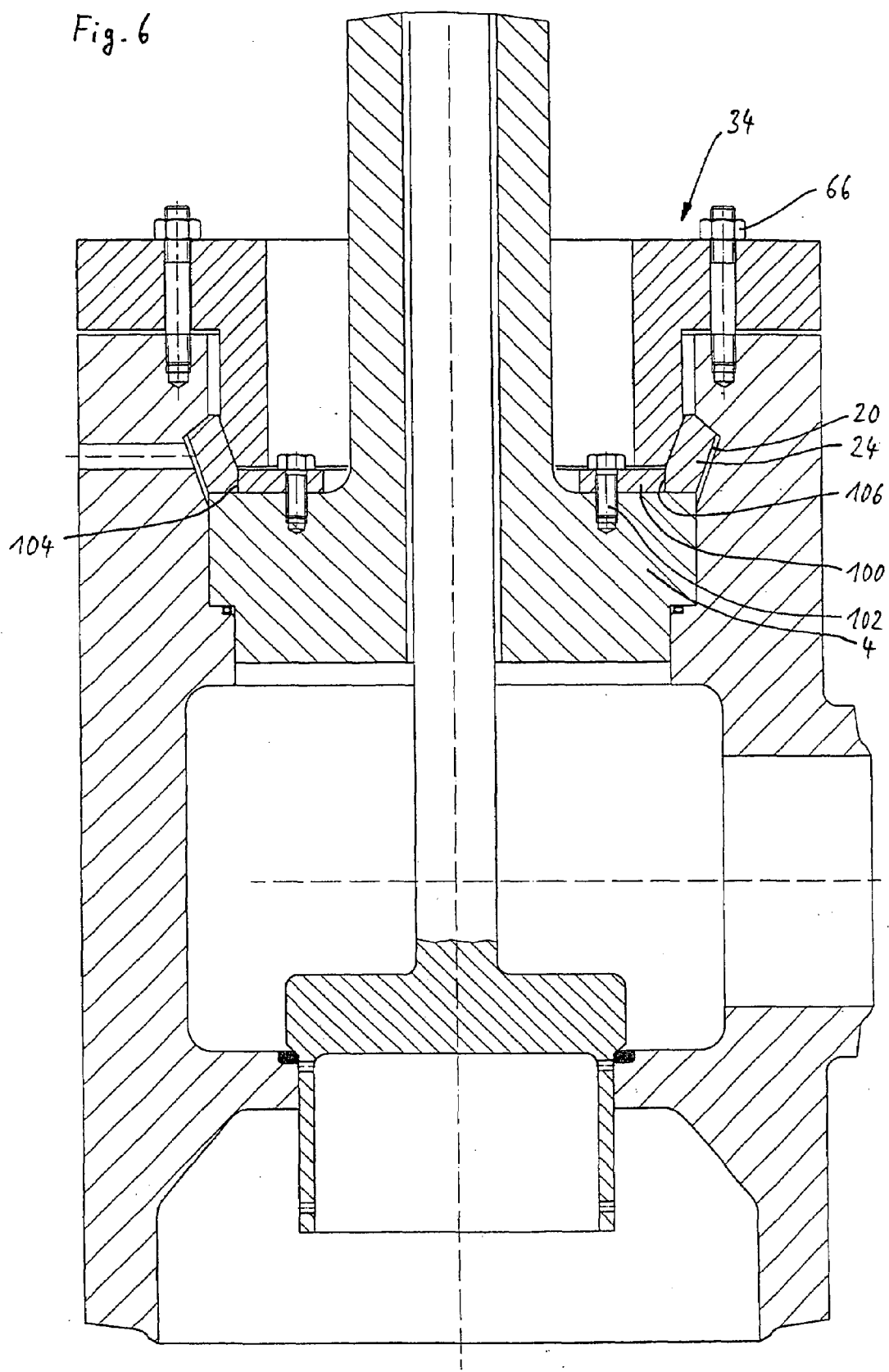

FIG. 6 shows a variant in which the expanding ring 34 is formed in accordance with FIG. 4, though in this case there is additionally a retaining ring 100 fixed to the collar 4 of the first component 2 by means of fastening screws 102. The retaining ring 100 has a retaining surface 104 running axis-cylindrically, with which it abuts correspondingly formed locking surfaces 106—which run axis-cylindrically—of the tensioning members 24. The diameter of the retaining surface 104 is in this case selected such that the retaining ring 100 can be inserted when the connection arrangement is in its assembled but unbraced state, without already bracing the tensioning members 24, but at the same time such that the tensioning members 24 cannot slip out of the hollowed out portion 20 when the retaining ring 100 is inserted. In other words, when the fastening nuts 66 are tightened, a radial gap, which is not shown in FIG. 6, appears between the retaining surface 104 and the locking surfaces 106, since the tensioning members 24 are braced radially outwardly. If the fastening should come loose in operation, for whatever reason, it is still not possible for the cover 2 to be pressed out of the socket 12; instead, there may merely be a more or less slight leak in the connection point in the region of the seal 18, because the tensioning members 24 still prevent any substantial axial movement of the components 2, 10 relative to one another.

Figure 7:
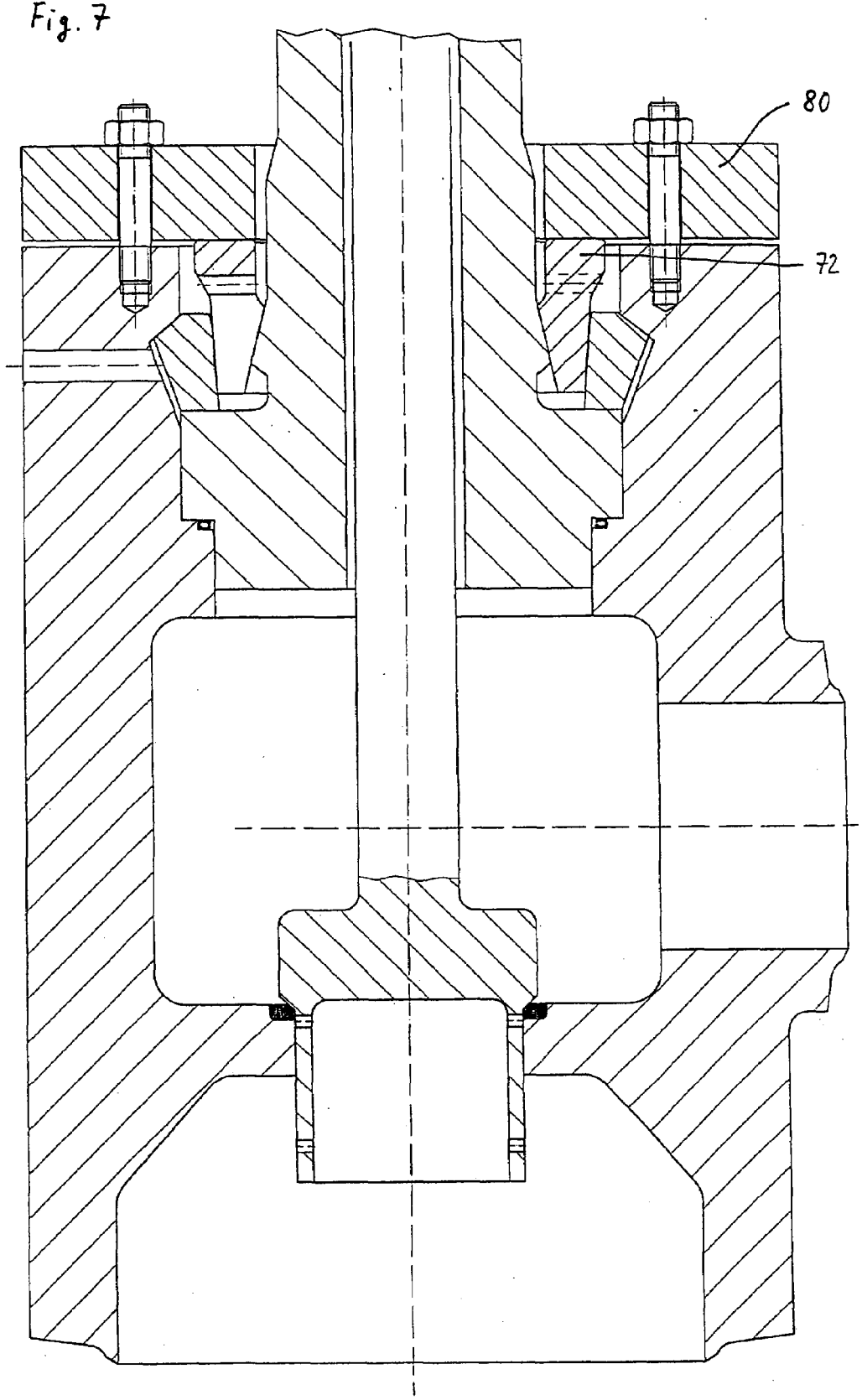

FIG. 7 shows a combination of the variants according to FIGS. 3 and FIG. 4, where a flange ring 80 is formed as a separate part and to a certain extent could also perform the function of a thrust collar, though this function, rather as in FIG. 7, is already performed by the thrust collar 72 as part of the expanding ring 34.

Figure 8:
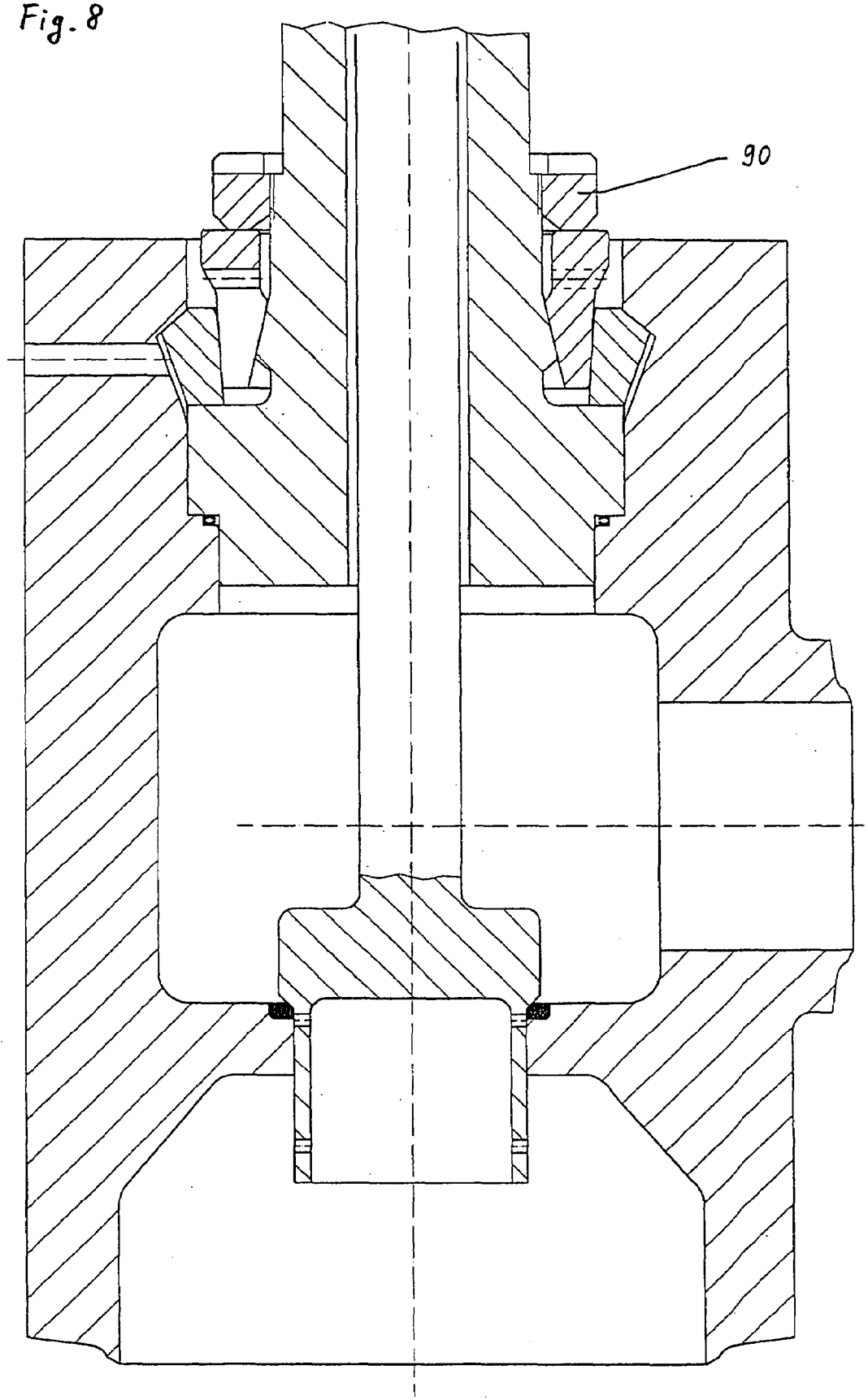

FIG. 8 shows a combination of FIGS. 3 and 5, in which, unlike FIG. 3, the tensioning means are formed by a threaded nut 90.

FIG. 9 shows a variant in which the tensioning members 24 do not (each) have, as has been the case so far, a first, radial wedge surface 26 and a second, conical wedge surface 28, but rather a first, conical wedge surface 26 and a second, radial wedge surface 28. It goes without saying that the first clamping surface 6 of the first component 2 corresponds to the second, conical wedge surface 28 and is thus likewise conically formed.

FIG. 9 also shows that the retaining ring 100, which was explained with reference to FIG. 6, can be replaced by a radial bearing collar 110 in the first clamping surface 6, the design of the wedge surfaces in accordance with FIG. 9 being particularly well-suited to this. In principle, however, even with a first clamping surface running radially in accordance with FIGS. 1 to 8, it is still possible to provide a radial bearing collar in order to achieve the function of preventing the arrangement from coming completely loose.

FIG. 10 shows a set of tensioning members 120 in accordance with the invention, consisting of four tensioning members 24 which are formed by dividing a rotationally symmetrical ring with a cross-section in accordance with FIG. 10a along two parallel secant sections 124, 126. Each individual tensioning member 24 has, similar to what is shown in FIG. 1, a first radial wedge surface 26, which could also be formed outwardly conically (FIG. 9), a second, outwardly conical wedge surface 28, which could also be formed radially (FIG. 9), and a third wedge surface 30, formed inwardly conically, which could also be formed axis-cylindrically, as has been explained in connection with FIGS. 3 and 7.

A major advantage of the set of tensioning members 120 according to the invention consists in the fact that the original ring is not divided into sectors along radial planes, but along parallel secant planes, which are spaced apart, so that the tensioning members can be assembled with the minimum spacing from one another.

What is claimed is:

1. A releasable connection arrangement, with a non-positive and positive fit, for two rotationally symmetrical components, at a connection point, especially for creating a leak-proof connection between closure elements on power plant valves, the connection arrangement comprises:
    a first component, which has a collar projecting radially outwards with a first clamping surface and a first bearing surface;
    a socket disposed at an open end of a second component for retaining the collar by gripping round it axially;
    a second bearing surface formed in the socket to cooperate with the first bearing surface;
    a groove formed either in the first or in the second bearing surface to receive a seal;
    a second clamping surface formed in the socket at an axial distance from the second bearing surface, and with a number of ring wedge-shaped tensioning members which are distributed over the circumference and are disposed such that first wedge surfaces abut the first clamping surface and second wedge surfaces abut the second clamping surface;
    wherein an expanding ring is provided, abutting third wedge surfaces of the tensioning members with an outer expanding surface, and tensioning means are provided, acting between the expanding ring and one of the components, with which the expanding ring can be moved axially and the tensioning members can be moved radially or radially/axially.

2. The connection arrangement as claimed in claim 1, wherein the first and the second bearing surfaces run radially.

3. The connection arrangement as claimed claim 1, wherein the groove is formed in a radial portion of the first or second bearing surface so as to arrange the seal in parallel to the bearing surface.

4. The connection arrangement as claimed in claim 1, wherein the first clamping surface includes a first wedge angle with the second clamping surface, which is matched to a cone angle of the outer expanding surface in such a way that the expanding ring causes self-locking bracing of the components.

5. The connection arrangement as claimed in claim 1, wherein the first clamping surface runs radially and the second clamping surface runs conically.

6. The connection arrangement as claimed in claim 1, wherein the first clamping surface runs conically and the second clamping surface runs radially.

7. The connection arrangement as claimed in claim 1, wherein the first and the second clamping surfaces run conically.

8. The connection arrangement as claimed in claim 1, wherein the expanding ring is formed continuously in the circumferential direction.

9. The connection arrangement as claimed in claim 1, wherein the tensioning means are formed as straining screws distributed over the circumference.

10. The connection arrangement as claimed in claim 9, wherein the straining screws are located in a straining ring secured axially to the first component.

11. The connection arrangement as claimed in claim 10, wherein the straining screws are secured to the first component by means of a circumferential groove and a sliding block.

12. The connection arrangement as claimed in claim 1, wherein the tensioning members consist of parts of a ring divided along two parallel secant planes.

13. The connection arrangement as claimed in claim 1, wherein the seal is formed as a metal O-ring seal.

14. The connection arrangement as claimed in claim 1, wherein the second component is a high-pressure valve and the first component is a lock member.

15. The connection arrangement as claimed in claim 14, wherein the lock member is a cover lock.

* * * * *